US009485142B2

(12) United States Patent
Zhu et al.

(10) Patent No.: US 9,485,142 B2
(45) Date of Patent: Nov. 1, 2016

(54) METHOD AND APPARATUS FOR DYNAMIC DL-UL RECONFIGURATION IN TDD SYSTEM (75) Inventors: Dalin Zhu, Beijing (CN); Zhennian Sun, Beijing (CN); Su Yi, Beijing (CN); Gang Wang, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 0 days.

(21) Appl. No.: 14/385,035

(22) PCT Filed: Mar. 30, 2012

(86) PCT No.: PCT/CN2012/073342
§ 371 (c)(1),
(2), (4) Date: Oct. 5, 2015

(87) PCT Pub. No.: WO2013/143132
PCT Pub. Date: Oct. 3, 2013

(65) Prior Publication Data
US 2016/0020953 A1    Jan. 21, 2016

(51) Int. Cl.
*H04L 12/24* (2006.01)
*H04W 72/04* (2009.01)
(Continued)

(52) U.S. Cl.
CPC ............ *H04L 41/0816* (2013.01); *H04L 5/14* (2013.01); *H04W 24/02* (2013.01); *H04W 72/042* (2013.01); *H04W 72/0413* (2013.01);
(Continued)

(58) Field of Classification Search
CPC ............... H04L 41/0816; H04L 5/14; H04W 72/0413; H04W 72/042; H04W 72/0486; H04W 88/08
See application file for complete search history.

(56) References Cited

U.S. PATENT DOCUMENTS 6,195,332 B1 * 2/2001 Tang ................. H04Q 11/0478
370/232
8,019,887 B2 * 9/2011 Chalupsky ............. H04L 29/06
709/233
(Continued)

FOREIGN PATENT DOCUMENTS

CN    101635979 A    1/2010
CN    101998556 A    3/2011
(Continued)

OTHER PUBLICATIONS

International Search Report of PCT/CN2012/073342 dated Jan. 10, 2013 [PCT/ISA/210].
(Continued)

*Primary Examiner* — Brian D Nguyen
(74) *Attorney, Agent, or Firm* — Sughrue Mion, PLLC (57) ABSTRACT Embodiments of the disclosure provide a method and apparatus for reconfiguring DL-UL resource allocation in a TDD system. The method includes steps of: a) obtaining traffic condition about DL and UL data to be transmitted; b) estimating system-wise transmission capability and/or UE-wise transmission capability, wherein the system-wise transmission capability accounts for DL transmission capability and UL transmission capability of the TDD system, and the UE-wise transmission capability accounts for transmission capabilities of different UEs; and c) reconfiguring the DL-UL resource allocation according to the obtained traffic condition and the estimated system-wise transmission capability and/or UE-wise transmission capability.

13 Claims, 8 Drawing Sheets (51) Int. Cl.
*H04L 5/14* (2006.01)
*H04W 24/02* (2009.01)
*H04W 28/18* (2009.01)
*H04W 72/08* (2009.01)
*H04W 88/08* (2009.01)

(52) U.S. Cl.
CPC ......... *H04W72/0486* (2013.01); *H04W 28/18* (2013.01); *H04W 72/087* (2013.01); *H04W 88/08* (2013.01)

(56) References Cited

U.S. PATENT DOCUMENTS

| | | | | |
|---|---|---|---|---|
| 9,002,389 | B2* | 4/2015 | Xiao | H04W 52/0229 455/509 |
| 2004/0014491 | A1* | 1/2004 | Weigand | H04L 12/2602 455/552.1 |
| 2008/0159237 | A1* | 7/2008 | Dominique | H04W 52/325 370/335 |
| 2010/0198985 | A1* | 8/2010 | Kanevsky | H04L 45/02 709/241 |
| 2011/0211503 | A1 | 9/2011 | Che et al. | |

FOREIGN PATENT DOCUMENTS

| | | |
|---|---|---|
| JP | 11-234242 A | 8/1999 |
| JP | 2002-112326 A | 4/2002 |
| JP | 2002-165248 A | 6/2002 |
| JP | 2003-234715 A | 8/2003 |
| JP | 2011-182104 A | 9/2011 |
| WO | 03/039059 A1 | 5/2003 |
| WO | 2012/027718 A1 | 3/2012 |

OTHER PUBLICATIONS

Communication dated Sep. 15, 2015 from the Japanese Patent Office in counterpart application No. 2015-500741.

* cited by examiner

| DL-UL configuration | Switching-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 8 though the US buffers cated data volume ratio for transmissions of the next X ms.

METHOD AND APPARATUS FOR DYNAMIC DL-UL RECONFIGURATION IN TDD SYSTEM

FIELD OF THE INVENTION

The present invention relates to wireless communication systems, and more particularly to Downlink (DL)-Uplink (UL) reconfiguration in a Time Division Duplex (TDD) system.

BACKGROUND OF THE INVENTION

In a wireless communication system, resource allocation is necessary to perform communication between a Base Station (BS) and User Equipments (UEs) served by the BS. Due to the different multiplexing modes of resources of the wireless communication system, different mechanisms, or configurations, should be adopted to perform the resource allocation. Currently, there are two popular multiplexing modes of resources in the art, i.e. Time Division Duplex (TDD) mode and Frequency Division Duplex (FDD) mode. In the TDD mode, a single bandwidth is shared by the BS and the respective UE for both DL communication and UL communication therebetween, and the sharing is performed by allotting different periods of time for DL communication and UL communication respectively. Here, as known in the art, Downlink (DL) (or forward link) refers to the communication link from the BS to the UE, and Uplink (UL) (or reverse link) refers to the communication link from the UE to the BS. This communication link may be established through Single In Single Out (SISO), Multiple In Single Out (MISO) or a Multiple In Multiple Out (MIMO) system.

Figure 1:
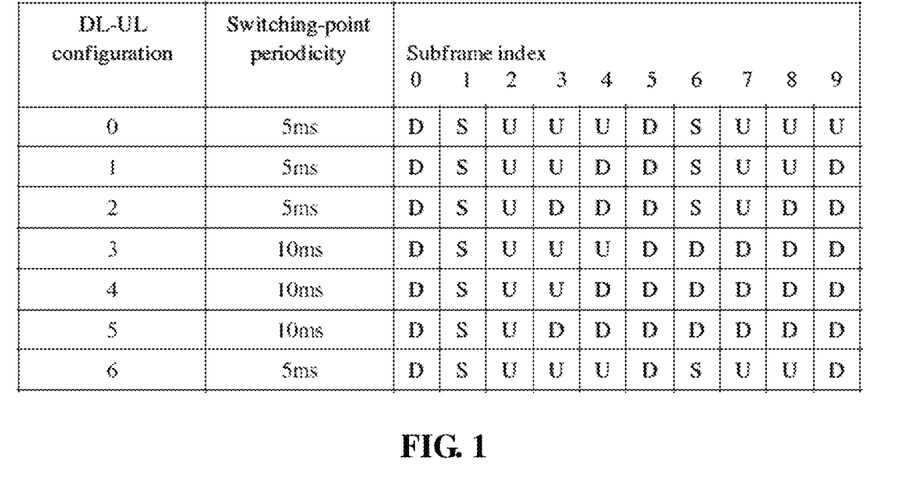
FIG. 1 illustrates the seven DL-UL configurations currently employed in the TD-LTE system

In a TDD system, such as a TD-LTE (Time Division-Long Term Evolution) system, seven different DL-UL (downlink and uplink) configurations 0 through 6 are defined and thereby asymmetric DL-UL allocations are supported. FIG. 1 illustrates the seven DL-UL configurations currently employed in the TD-LTE system, where D represents the DL subframe, U denotes the UL subframe, and S corresponds to the special subframe. As shown in FIG. 1, each of the seven configurations provides a specific DL-UL allocation different from the others, which enables flexible DL-UL reconfiguration according to traffic demands. For instance, in layered heterogeneous networks, it would be of great interest to deploy different DL-UL configurations in different cells. This is because in small-cell scenario, traffic patterns may vary from cell to cell. Even within one cell, obvious DL and UL traffic fluctuations could be observed from time to time.

Figure 2:
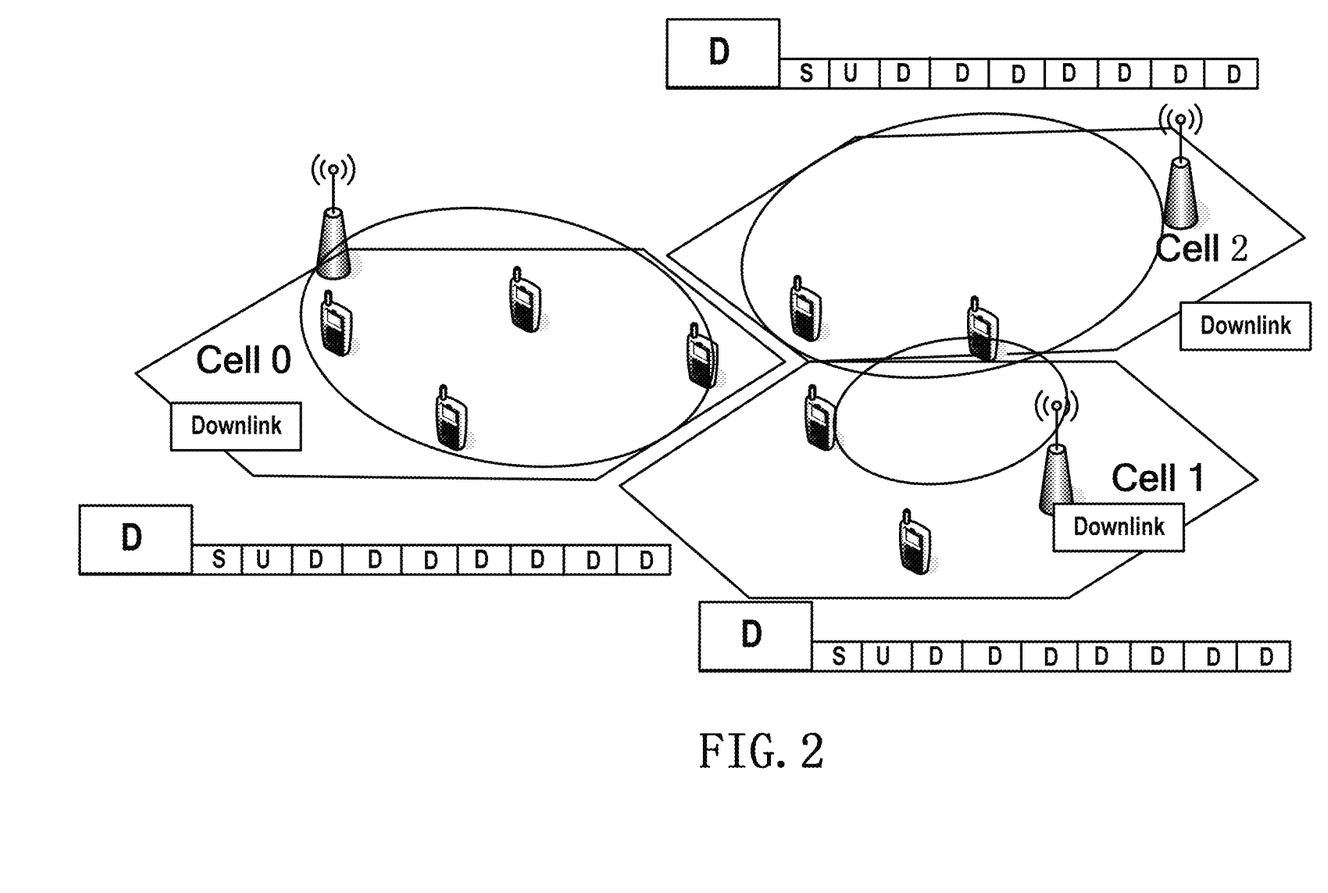
FIG. 2 illustrates a schematic diagram of static or semi-static DL-UL configurations of cells in the TD-LTE system.

However, in current TD-LTE system, all cells employ the same DL-UL configuration and only static or semi-static configuration is implemented. That is, the DL-UL configuration would be adjusted in months, or even years and kept the same among different cells, which may not match the instantaneous traffic condition when significant variations of downlink and uplink traffic are observed. For example, as shown in FIG. 2, all the neighboring cells have the same DL-UL configuration 5, and as stated above, the configuration will never be changed (i.e. static configuration) or will only be changed after months or even years (i.e. semi-static configuration).

Currently, 3GPP (3rd Generation Partnership Project) is discussing dynamic DL-UL reconfiguration methods triggered by traffic condition variations, in which the reconfiguration process can be conducted every milliseconds (ms) depending on the traffic condition about the DL and UL data to be transmitted. In particular, the BS calculates the ratio of data volumes to be transmitted in the DL and UL buffers every X ms (here, X is an integer larger than 0, and preferably may be 10 or 640), and then selects from the seven configurations one configuration that has DL-UL ratio closest to the calculated data volume ratio for transmissions of the next X ms.

Even so, such methods are still not effective enough to achieve the best overall system performance since, in addition to the data volumes to be transmitted, many other factors such as transmission capability may have great impact on the selection of appropriate configuration as well. These factors should be taken into account when adjusting the DL-UL configuration in order to achieve promising overall system performance.

SUMMARY OF THE INVENTION

In view of this, a method and apparatus for DL/UL reconfiguration in a TDD system is provided that takes, in addition to the traffic condition about DL and UL data to be transmitted, the transmission capability such as the system-wise transmission capability and/or the UE-wise transmission capability into account for the reconfiguration.

According to a first aspect of the present invention, embodiments of the invention provide a method for reconfiguring Downlink (DL)-Uplink (UL) resource allocation in a Time Division Duplex (TDD) system having a Base Station (BS) and a plurality of User Equipments (UEs) served by the BS, including steps of: a) obtaining traffic condition about DL and UL data to be transmitted; b) estimating system-wise transmission capability and/or UE-wise transmission capability, wherein the system-wise transmission capability accounts for DL transmission capability and UL transmission capability of the TDD system, and the UE-wise transmission capability accounts for transmission capabilities of different UEs; and c) reconfiguring the DL-UL resource allocation according to the obtained traffic condition and the estimated system-wise transmission capability and/or UE-wise transmission capability.

According to a second aspect of the present invention, embodiments of the invention provide an apparatus for reconfiguring Downlink (DL)-Uplink (UL) resource allocation in a Time Division Duplex (TDD) system having a Base Station (BS) and a plurality of User Equipments (UEs) served by the BS, including: an obtaining unit configured to obtain traffic condition about DL and UL data to be transmitted; an estimating unit configured to estimate system-wise transmission capability and/or UE-wise transmission capability, wherein the system-wise transmission capability accounts for DL transmission capability and UL transmission capability of the TDD system, and the UE-wise transmission capability accounts for transmission capabilities of different UEs; and a reconfiguring unit configured to reconfigure the DL-UL resource allocation according to the obtained traffic condition and the estimated system-wise transmission capability and/or UE-wise transmission capability With the solutions provided by the present invention, DL-UL resource allocation may be dynamically reconfigured such that better system performance may be achieved than either the conventional static or semi-static solutions or the solutions being discussed by 3GPP with only the traffic condition taken into account.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where.

DETAILED DESCRIPTION OF EMBODIMENTS

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

Generally speaking, the present disclosure provides a method and apparatus for reconfiguring DL-UL resource allocation in a TDD system, where the Base Station (BS) may estimate, in addition to the traffic condition about DL and UL data to be transmitted, system-wise transmission capability and/or UE-wise transmission capability, and reconfigure the DL-UL resource allocation according to both the traffic condition and the system-wise transmission capability and/or UE-wise transmission capability.

Figure 3:
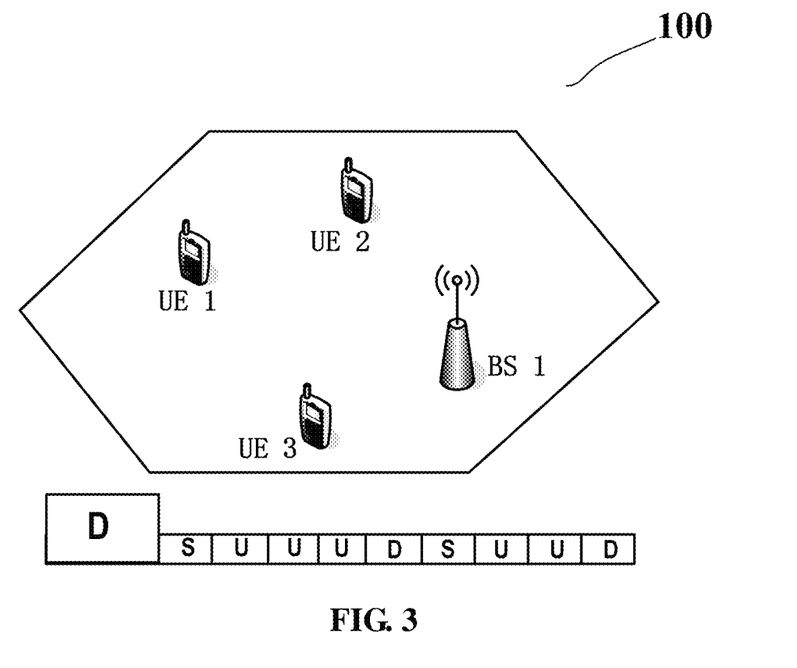
FIG. 3 illustrates a system according to embodiments of the present invention.

FIG. 3 illustrates a system 100 such as a TD-LTE system according to embodiments of the present invention. The system 100 includes for example a Base Station (BS 1) and three User Equipments (UE 1, UE 2, and UE 3). It is to be noted that one BS and three UEs are illustrated only for sake of explanation and there may be any number of BSs and/or UEs in the system 100.

Moreover, in the present invention, only single-cell deployment is considered, for example as illustrated in FIG. 3, however, those skilled in the art may easily extend the inventive concept of the present invention to multi-cell deployment.

In the disclosure, a User Equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included.

In the disclosure, a Base Station (BS) may refer to a node B (NodeB or NB) or an evolved NodeB (eNodeB or eNB). A base station may be a macrocell BS or a small cell BS. According to the present invention, a macrocell BS may be a base station which manages a macrocell, for example, a macro eNB, and a small cell BS may be a base station which manages a small cell, for example, a pico eNB, a femto eNB, and some other suitable low power nodes.

Figure 4:
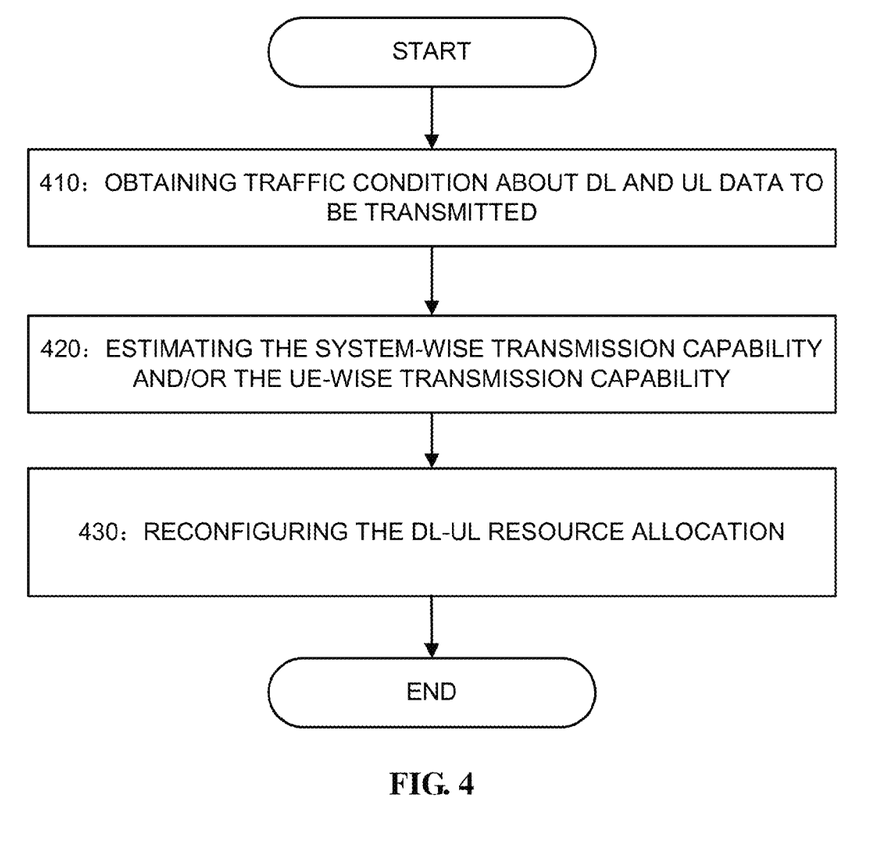
FIG. 4 illustrates a flow chart of a method for reconfiguring DL-UL resource allocation in a TDD system according to embodiments of the present invention.

FIG. 4 illustrates a flow chart of a method 400 for reconfiguring DL-UL resource allocation in a TDD system such as a TD-LTE system. The method of FIG. 4 may be performed at the BS 1 of system 100 at intervals of a predetermined time period.

At step 410, the BS 1 obtains traffic condition about DL and UL data to be transmitted. In one example, the traffic condition may be obtained by obtaining DL data volume in the DL buffer and UL data volume in the UL buffer to be transmitted respectively and calculating data volume ratio of the DL data volume and the UL data volume. Here, the DL data volume may be calculated or otherwise obtained by the BS 1 from its DL buffer, and the UL data volume may be reported by respective UEs to the BS 1 through respective uplink control channels for example.

At step 420, the BS 1 estimates the system-wise transmission capability and/or the UE-wise transmission capability. The system-wise transmission capability accounts for difference of transmission capabilities between DL direction and UL direction of the system, while the UE-wise transmission capability accounts for transmission capabilities of different UEs served by the BS.

In one example, the transmission capability is evaluated by throughput in the previous X ms, such as DL throughput or UL throughput for the system or for respective UEs. In an alternative example, the transmission capability may be evaluated by expected throughput in the next X ms.

Usually, transmission capability of a UE or a BS depends at least one of numbers of transmit and/or receive antennas of the BS and the UE, transmit powers of the BS and/or the UE, and channel conditions between the BS and the UE.

At step 430, the BS 1 may reconfigure the DL-UL resource allocation according to the traffic condition obtained at step 410 and the system-wise transmission capability and/or UE-wise transmission capability estimated at step 420.

In one example, the reconfiguration may be performed by selecting one configuration from the seven configurations available in the system depending on the comparison of the DL-UL ratio of the seven configurations and that modified based on the estimated transmission capability. In one example, the reconfiguration may be performed by selecting from the seven configurations the configuration having the DL-UL ratio closest to the modified DL-UL ratio modified according to the present invention.

For example, for l=0, . . . , 6, the DL-UL ratio $K_l^c$ of configuration l may be calculated as $$K_l^c = \frac{N_l^{DL} \times N_{OFDM} + N_l^S \times K_{DwPTS}}{N_l^{UL} \times N_{OFDM} + N_l^S \times K_{UpPTS}} \quad (1)$$

where $N_l^{DL}$, $N_l^{UL}$ and $N_l^S$ represent the numbers of DL, UL and special subframes in one radio frame of configuration l, respectively; $N_{OFDM}$ denotes the number of OFDM symbols in one subframe; and $K_{DwPTS}$ and $K_{UpPTS}$ are ratios of UpPTS and DwPTS in one special frame, respectively.

It is to be noted that the DL-UL ratio may also be otherwise calculated. For example, since $K_{DwPTS}$ is usually much larger than $K_{UpPTS}$, a special subframe may be approximately considered as a DL subframe, and thus the above equation (1) may be approximately revised as $$K_l^c = \frac{N_l^{DL} \times N_{OFDM} + N_l^S}{N_l^{UL} \times N_{OFDM}} \quad (2)$$

It is well known for those skilled in the art on how to calculate the DL-UL ratio for a specific configuration and thus will not be described in detail herein.

Depending on the perspective of whether only the system-wise transmission capability, only the UE-wise transmission capability, or both the system-wise transmission capability and the UE-wise transmission capability is taken into account, three specific embodiments are provided hereinafter.

First Embodiment

Figure 5:
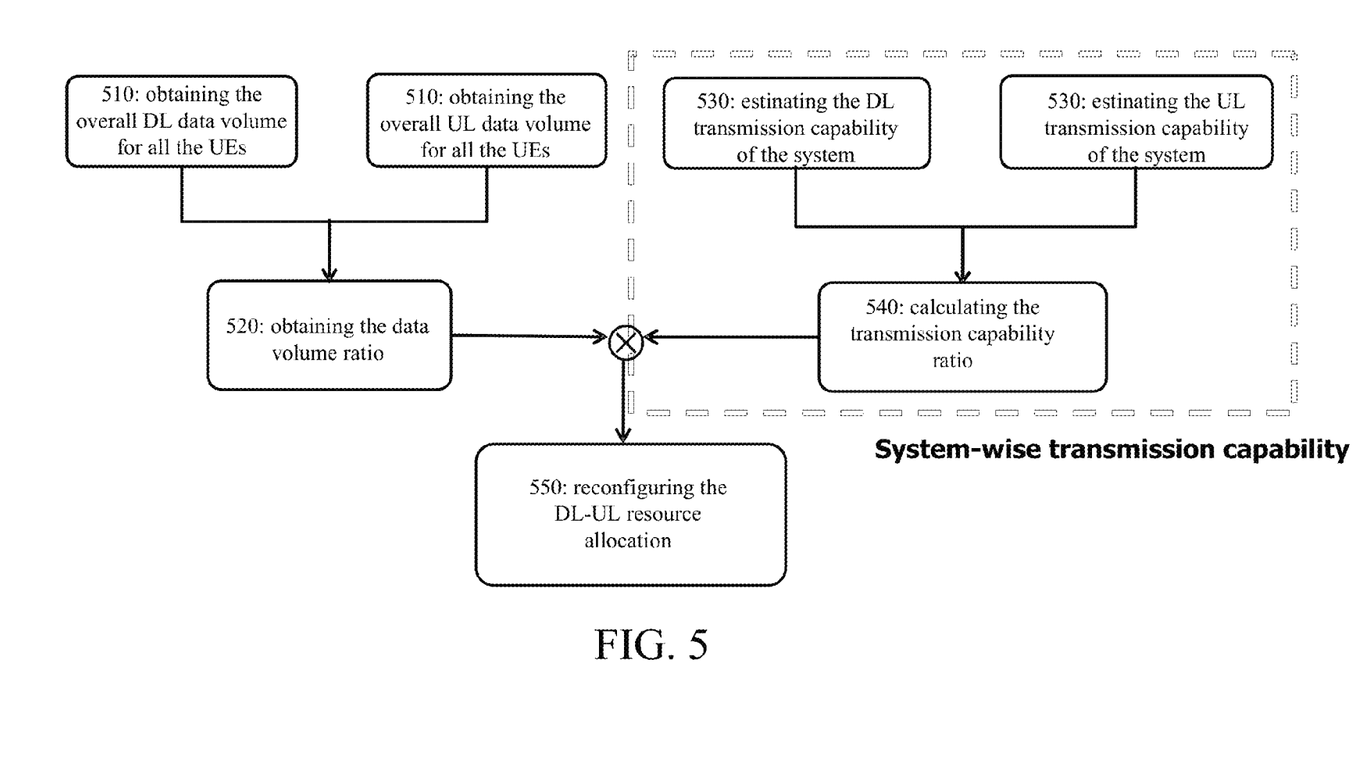
FIG. 5 illustrates a first embodiment of the method for reconfiguring the DL-UL resource allocation according to the present invention.

FIG. 5 illustrates a first embodiment of the method for reconfiguring the DL-UL resource allocation according to the present invention. In the first embodiment, only the system-wise transmission capability is taken into account for the reconfiguration.

Referring to FIG. 5, the BS 1 obtains at step 510 the overall DL data volume and the overall UL data volume for all the UEs served by BS 1, for example, all of UE 1, UE 2 and UE 3 as shown in FIG. 3, and obtains at step 520 the ratio of the overall DL data volume and the overall UL data volume as the data volume ratio.

At step 530, the BS 1 estimates the DL transmission capability and the UL transmission capability of the system 100 respectively, and calculates at step 540 ratio of the DL transmission capability and the UL transmission capability as the transmission capability ratio.

In one example, the transmission capability is evaluated by average system throughput in a previous predetermined time period X ms. For example, in one implementation, it is assumed that the total number of DL subframes in the previous X ms is $T_D$. Then, for DL subframe r (r=1, 2, . . . , $T_D$), BS 1 may calculate the throughput of respective UE i according to the following equation (3).

$$C_{i,r}^D = BW_{i,r}^D \log\left[\det\left(I_{M_R^D} + \frac{\rho_{i,r}^D P_{i,r}^2}{M_T^D} H_{i,r}^D (H_{i,r}^D)^H\right)\right] \quad (3)$$

$$= BW_{i,r}^D \log\left[1 + \frac{\rho_{i,r}^D P_{i,r}^2}{M_T^D} tr\left(H_{i,r}^D (H_{i,r}^D)^H\right)\right]$$

where i=1, 2, . . . , $N_r^D$, $N_r^D$ is the number of active UEs within DL subframe r; $BW_{i,r}^D$ represents the allocated bandwidths for UE i in DL subframe r, in terms of Resource Blocks (RBs); $\rho_{i,r}^D$ denotes the received signal to interference and noise ratio (SINR) of UE i in DL subframe r, in the form of channel quality indicator (CQI); $P_{i,r}$ corresponds to the path loss of UE i in DL subframe r; $M_T^D$ and $M_R^D$ denote the number of DL transmit and receive antennas, respectively; $H_{i,r}^D$ is the $M_R^D \times M_T^D$ channel matrix of UE i in DL subframe r with each component distributed according to CN(0,1).

The BS 1 may then calculate the total throughput of DL subframe r for all the active UEs by summing respective throughput for respective UE i, for example, according to the following equation (4).

$$\tilde{C}_r^D = \sum_{i=1}^{N_r^D} C_{i,r}^D \quad (4)$$

$$= \sum_{i=1}^{N_r^D} BW_{i,r}^D \log\left[1 + \frac{\rho_{i,r}^D P_{i,r}^2}{M_T^D} tr\left(H_{i,r}^D (H_{i,r}^D)^H\right)\right]$$

Then, the BS 1 may calculate the total throughput for all the $T_D$ DL subframes in the transmission of the previous X ms and calculate the average throughput of the DL transmission as $$C_D = \sum_{r=1}^{T_D} \tilde{C}_r^D / T_D, \quad (5)$$

which may be regarded as an evaluation of the DL transmission capacity of the system.

The UL transmission capability may be similarly and correspondingly evaluated as $$C_U = \sum_{s=1}^{T_U} \tilde{C}_s^U / T_U \quad (6)$$

where $$\tilde{C}_s^U = \sum_{j=1}^{N_s^U} BW_{j,s}^U \log\left[1 + \frac{\rho_{j,s}^D P_{j,s}^2}{M_T^U} tr\left(H_{j,s}^U (H_{j,s}^U)^H\right)\right],$$

and $C_U$, $\tilde{C}_s^U$, $T_U$, $BW_{j,s}^U$, $M_T^U$, $N_s^U$, $P_{j,s}$, $H_{j,s}$ and $\rho_{j,s}^U$ have similar and corresponding meanings as those defined for DL and thus may be similarly obtained. Here, $\rho_{i,r}^D$, $\rho_{j,s}^U$ can be directly reported from respective UEs to the BS 1 through PUSCH (Physical Uplink Shared Channel) without quantization.

In other words, the DL transmission capability $C_D$ and the UL transmission capability $C_U$ may be interpreted as the average number of packets that can be transmitted per DL subframe and UL subframe, respectively.

It is well known for those skilled in the art on how to calculate the throughput for a certain time period and thus will not be described in detail herein.

At step 550, the BS 1 reconfigures the DL-UL resource allocation based on the data volume ratio obtained at step 520 and the transmission capability ratio calculated at step 540. In one implementation, the BS 1 selects from the seven configurations available in the system 100 one configuration having the DL-UL ratio closest to the modified DL-UL ratio according to this embodiment.

Respective DL-UL ratios for the seven configurations available in the system 100 may for example be calculated by equation (1) or (2).

As stated above, the DL transmission capability $C_D$ and the UL transmission capability $C_U$ may be interpreted as the average number of packets that can be transmitted per DL subframe and UL subframe, respectively. Hence, if the DL data volume $B_D$ and the UL data volume $B_U$ are given and the data volume ratio is denoted as $$K_b = \frac{B_D}{B_U},$$

the required number of DL and UL subframes for the forthcoming X ms can be correspondingly estimated as $B_D/C_D$ and $B_U/C_U$ respectively. Therefore, if the transmission capability ratio is denoted as $K_S = C_D/C_U$, the modified DL-UL ratio according to the first embodiment may be computed as $$K_{bs} = \frac{B_D/C_D}{B_U/C_U} = \frac{1}{K_s} K_b \quad (7)$$

Therefore, the selection may be performed by finding the configuration l that meets the following selection criterion $$l_m^{(1)} = \arg\min_{l=0,1,\ldots,6} |K_l^c - K_{bs}| \quad (8)$$

Second Embodiment

Figure 6:
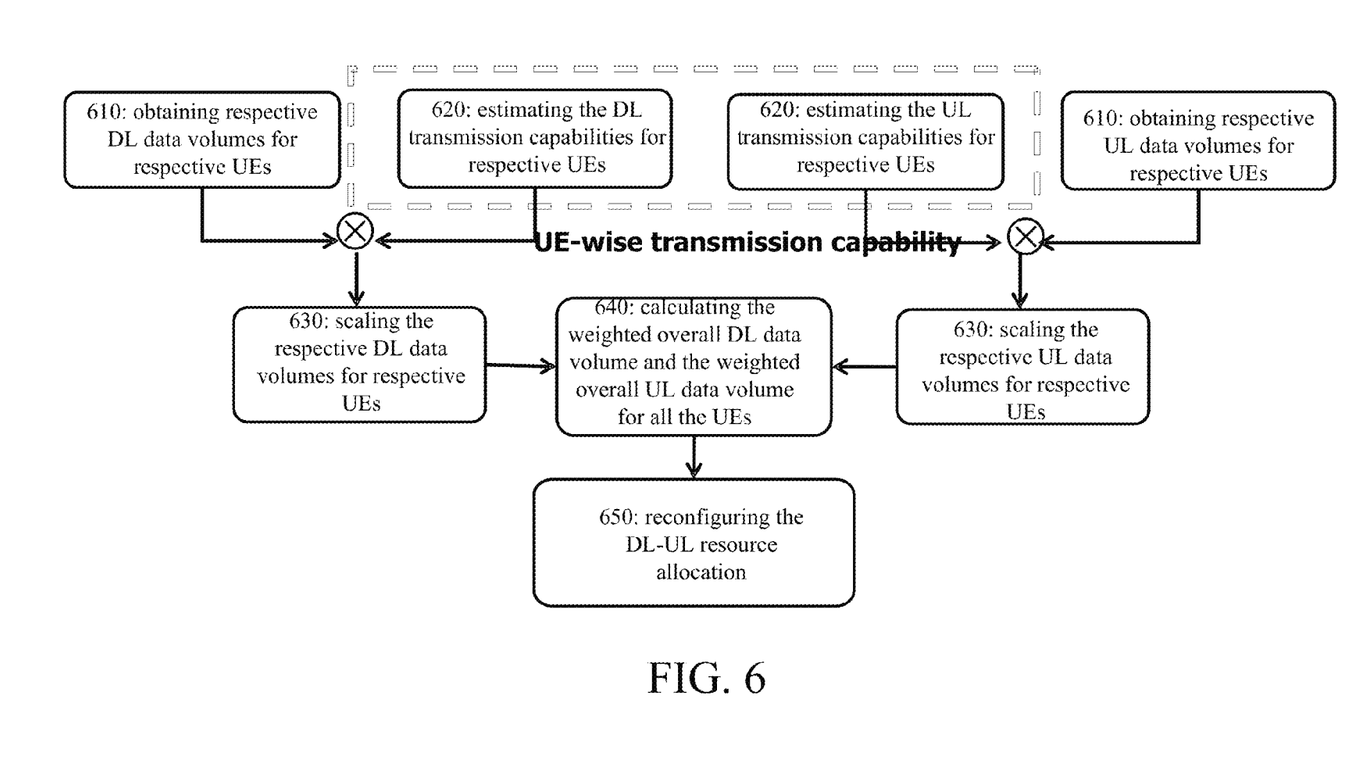
FIG. 6 illustrates a second embodiment of the method for reconfiguring the DL-UL resource allocation according to the present invention.

FIG. 6 illustrates a second embodiment of the method for reconfiguring the DL-UL resource allocation according to the present invention. In the second embodiment, only the UE-wise transmission capability is taken into account for the reconfiguration. That is, deference between the transmission capabilities of different UEs is taken into account.

Referring to FIG. 6, the BS 1 obtains at step 610 respective DL data volumes and respective UL data volumes for respective UEs served by BS 1, for example, each of UE 1, UE 2 and UE 3 as shown in FIG. 3.

At step 620, the BS 1 estimates the DL transmission capabilities and the UL transmission capabilities for respective UEs.

In one example, the transmission capability for each UE is evaluated by average throughput for the UE in the previous predetermined time period X ms. Same assumptions and annotations are used in this embodiment as in the first embodiment.

Firstly, the BS 1 estimates the average throughput for UE n in DL transmission in the previous X ms. For example, the average throughput for UE n may be calculated as $$\overline{C}_n^D = \sum_{p=1}^{T_n^D} C_{n,p}^D / T_n^D \quad (9)$$

$$= \sum_{p=1}^{T_n^D} BW_{n,p}^D \log\left[1 + \frac{\rho_{n,p}^D P_{n,p}^2}{M_T^D} \times tr\left(H_{n,p}^D (H_{n,p}^D)^H\right)\right] / T_n^D$$

where $T_n^D$ corresponds to the number of DL subframes for UE n in the previous X ms. Similar to the first embodiment, the average throughput for UE n in the previous X ms may be evaluated as the transmission capability of UE n.

The BS 1 may then at step 630 scales the respective DL data volumes for respective UEs by factors that represent the ratios between the DL transmission capabilities of respective UEs and the maximum DL transmission capability among all UEs served by the BS 1. In other words, each of the DL data volumes for respective UEs are weighted by the above factors respectively. For example, the scaled DL data volume for UE n may be expressed as $$\frac{1}{K_n^D} B_n^D,$$

where $B^D$ is the DL data volume to be transmitted for UE n in the DL buffer, the factor for UE n in DL direction is denoted as $K_n^D = \overline{C}_n^D / \overline{C}_m^D$, and m is index of the UE having the maximum DL transmission capability among all the UEs.

Similarly, the scaled UL data volume for UE n may be expressed as $$\frac{1}{K_n^U} B_n^U,$$

where the factor for UE n in UL direction is denoted as $K_n^U = \overline{C}_n^U / \overline{C}_j^U$, and j is index of the UE having the maximum UL transmission capability among all the UEs.

At step 640, the BS 1 calculates sum of the weighted DL data volumes and sum of the weighted UL data volumes for all the UEs. For example, sum of the weighted DL data volumes and sum of the weighted overall UL data volumes may be respectively calculated as $$\sum_{n=1}^{N} \frac{1}{K_n^D} B_n^D \text{ and } \sum_{n=1}^{N} \frac{1}{K_n^U} B_n^U.$$

At step 650, the BS 1 reconfigures the DL-UL resource allocation based on the modified ratio between the sum of the weighted DL data volumes and the sum of the weighted UL data volumes. Since the UE-wise transmission capability has been taken into account when calculating the weighted DL data volume and the weighted UL data volume, the reconfiguration is in substance based on both the traffic condition and the UE-wise transmission capability.

In one implementation, the BS 1 selects from the seven configurations available in the system 100 one configuration having the DL-UL ratio closest to the modified DL-UL ratio according to this embodiment.

Respective DL-UL ratios for the seven configurations available in the system 100 may for example be calculated by equation (1) or (2).

The modified DL-UL ratio according to this embodiment may be computed as $$K_{bu} = \frac{\sum_{n=1}^{N} \frac{1}{K_n^D} B_n^D}{\sum_{n=1}^{N} \frac{1}{K_n^U} B_n^U} \qquad (10)$$

Therefore, the selection may be performed by finding the configuration l that meets the following selection criterion from the seven configurations $$l_m^{(2)} = \arg\min_{l=0,1,\ldots,6} |K_l^c - K_{bu}| \qquad (11)$$

Third Embodiment

Figure 7:
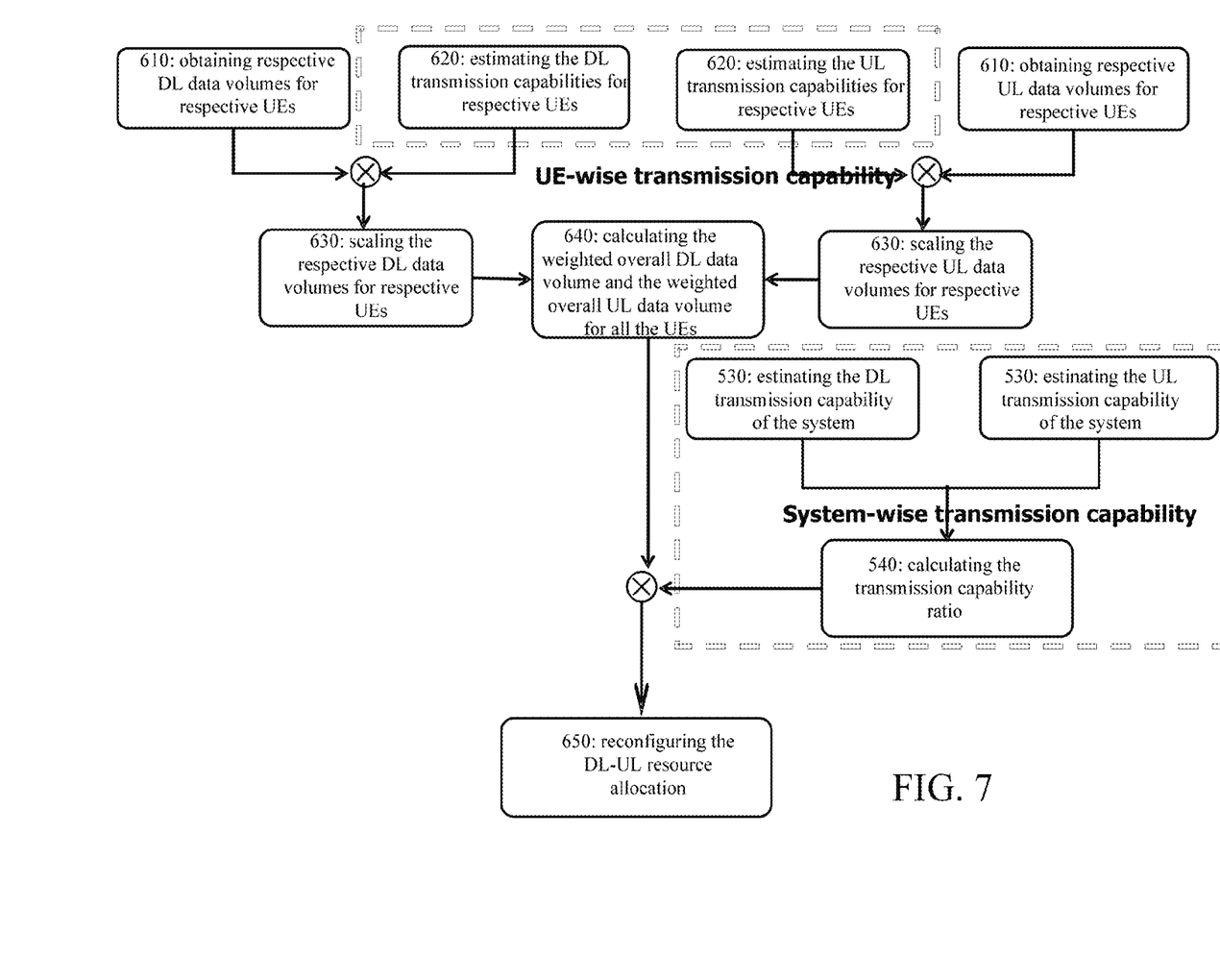
FIG. 7 illustrates a third embodiment of the method for reconfiguring the DL-UL resource allocation according to the present invention.

FIG. 7 illustrates a third embodiment of the method for reconfiguring the DL-UL resource allocation according to the present invention. In the third embodiment, both the system-wise transmission capability and the UE-wise transmission capability are taken into account for the reconfiguration. The third embodiment may be considered as a combination of the first embodiment and the second embodiment.

Since respective steps in FIG. 7 are almost the same as those in the first embodiment or the second embodiment, the same reference numbers are used in FIG. 7 as in FIG. 5 and FIG. 6 and thus description thereof is omitted.

As an example, the BS 1 may select from the seven configurations available in the system 100 the configuration l that meets the following selection criterion $$l_m^{(3)} = \arg\min_{l=0,1,\ldots,6} \left| K_l^c - \frac{1}{K_s} K_{bu} \right| \qquad (12)$$

Figure 8:
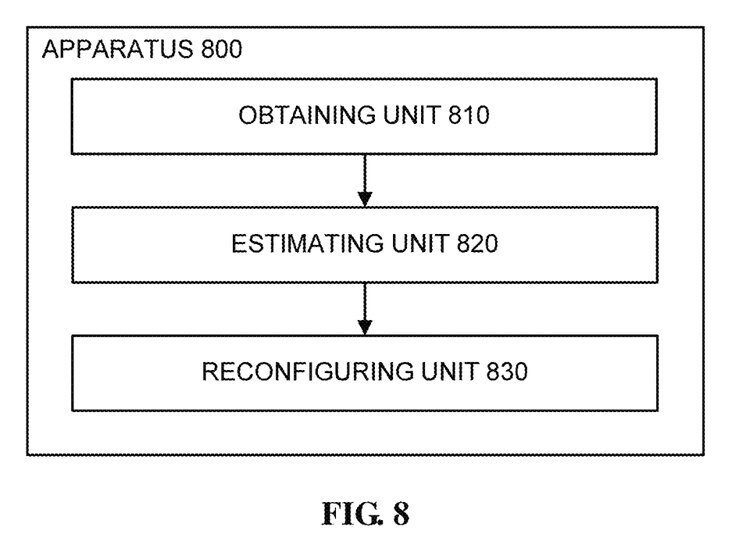
FIG. 8 illustrates a block diagram of an apparatus for reconfiguring the DL-UL resource allocation according to the present invention.

FIG. 8 illustrates a block diagram of an apparatus 800 for reconfiguring DL-UL resource allocation according to embodiments of the invention. The apparatus may be used in a Base Station such as BS 1 as shown in FIG. 3.

In this embodiment, the apparatus 800 comprises an obtaining unit 810, an estimating unit 820 and a reconfiguring unit 830. The obtaining unit 810 may be configured to obtain traffic condition about DL and UL data to be transmitted. The estimating unit 820 may be configured to estimate the system-wise transmission capability and/or the UE-wise transmission capability. The reconfiguring unit 830 may be configured to reconfigure the DL-UL resource allocation according to the traffic condition obtained by the obtaining unit 810 and the system-wise transmission capability and/or UE-wise transmission capability estimated by the estimating unit 820.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 4-8 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for reconfiguring Downlink (DL)-Uplink (UL) resource allocation in a Time Division Duplex (TDD) system having a Base Station (BS) and a plurality of User Equipments (UEs) served by the BS, comprising steps of:
   obtaining, by at least one processor, traffic condition about DL and UL data to be transmitted;
   estimating, by at least one processor, system-wise transmission capability or UE-wise transmission capability, wherein the system-wise transmission capability accounts for DL transmission capability and UL transmission capability of the TDD system, and the UE-wise transmission capability accounts for transmission capabilities of different UEs; and
   reconfiguring, by at least one processor, the DL-UL resource allocation according to the obtained traffic condition and the estimated system-wise transmission capability or UE-wise transmission capability.

2. The method of claim 1, wherein the obtaining operation comprises obtaining DL data volume in DL buffer and UL data volume in UL buffer to be transmitted, respectively, and calculating data volume ratio of the DL data volume and the UL data volume.

3. The method of claim 1,
   wherein the obtaining operation comprises obtaining overall DL data volume in DL buffers and overall UL data volume in UL buffers for the plurality of UEs of the TDD system, and obtaining data volume ratio of the overall DL data volume and the overall UL data volume, and
   wherein the estimating operation comprises estimating the DL transmission capability and the UL transmission capability of the TDD system and calculating transmission capability ratio of the DL transmission capability and the UL transmission capability.

4. The method of claim 3,
   wherein the reconfiguring operation comprises selecting from a plurality of configurations one configuration having a DL-UL ratio closest to a modified DL-UL ratio, the modified DL-UL ratio being obtained by dividing the data volume ratio by the transmission capability ratio.

5. The method of claim 1,
   wherein the obtaining operation comprises obtaining respective DL data volumes and respective UL data volume for respective UEs of the plurality of UEs, and
   wherein the estimating operation comprises:
      estimating the DL transmission capability and the UL transmission capability for each UE;
      scaling the DL data volume and the UL data volume for the UE by a DL factor and a UL factor respectively, the DL factor representing the ratio between the DL transmission capability of the UE and the maximum DL transmission capability among the plurality of UEs, and the UL factor representing the ratio between the UL transmission capability of the UE and the maximum UL transmission capability among the plurality of UEs; and
      calculating sum of the scaled DL data volumes and sum of the scaled UL data volumes for the plurality of UEs respectively.

6. The method of claim 5,
   wherein the reconfiguring operation comprises selecting from a plurality of configurations one configuration having a DL-UL ratio closest to a modified DL-UL ratio, the mobified DL-UL ratio being obtained by dividing the sum of the scaled DL data volumes and the sum of the scaled UL data volumes.

7. The method of claim 5, wherein the estimating operation further comprises:
   estimating the DL transmission capability and the UL transmission capability of the TDD system, and calculating transmission capability ratio of the DL transmission capability and the UL transmission capability.

8. The method of claim 7,
   wherein the reconfiguring operation comprises selecting from a plurality of configurations one configuration having a DL-UL ratio closest to quotient of dividing the modified DL-UL ratio by the transmission capability ratio.

9. The method of claim 1, wherein the method is performed at intervals of a predetermined time period.

10. The method of claim 9, wherein the DL transmission capability and the UL transmission capability are evaluated by DL throughput and UL throughput in the previous predetermined time period.

11. The method of claim 1, wherein the traffic condition about the UL data to be transmitted is reported by the UEs to the BS.

12. The method of claim 1, wherein the transmission capability is estimated depending on at least one of numbers of transmit or receive antennas of the BS and the UEs, transmit powers of the BS or the UEs, and channel conditions between the BS and respective UEs.

13. An apparatus for reconfiguring Downlink (DL)-Uplink (UL) resource allocation in a Time Division Duplex (TDD) system having a Base Station (BS) and a plurality of User Equipments (UEs) served by the BS, comprising:
   an obtaining unit configured to obtain traffic condition about DL and UL data to be transmitted;
   an estimating unit configured to estimate system-wise transmission capability or UE-wise transmission capability, wherein the system-wise transmission capability accounts for DL transmission capability and UL transmission capability of the TDD system, and the UE-wise transmission capability accounts for transmission capabilities of different UEs; and
   a reconfiguring unit configured to reconfigure the DL-UL resource allocation according to the obtained traffic condition and the estimated system-wise transmission capability or UE-wise transmission capability.

* * * * *